June 14, 1932. F. E. HOERMANN 1,863,222
METHOD OF TREATING FOOD AND OTHER PRODUCTS WITH HIGH FREQUENCY OSCILLATIONS
Filed May 20, 1929
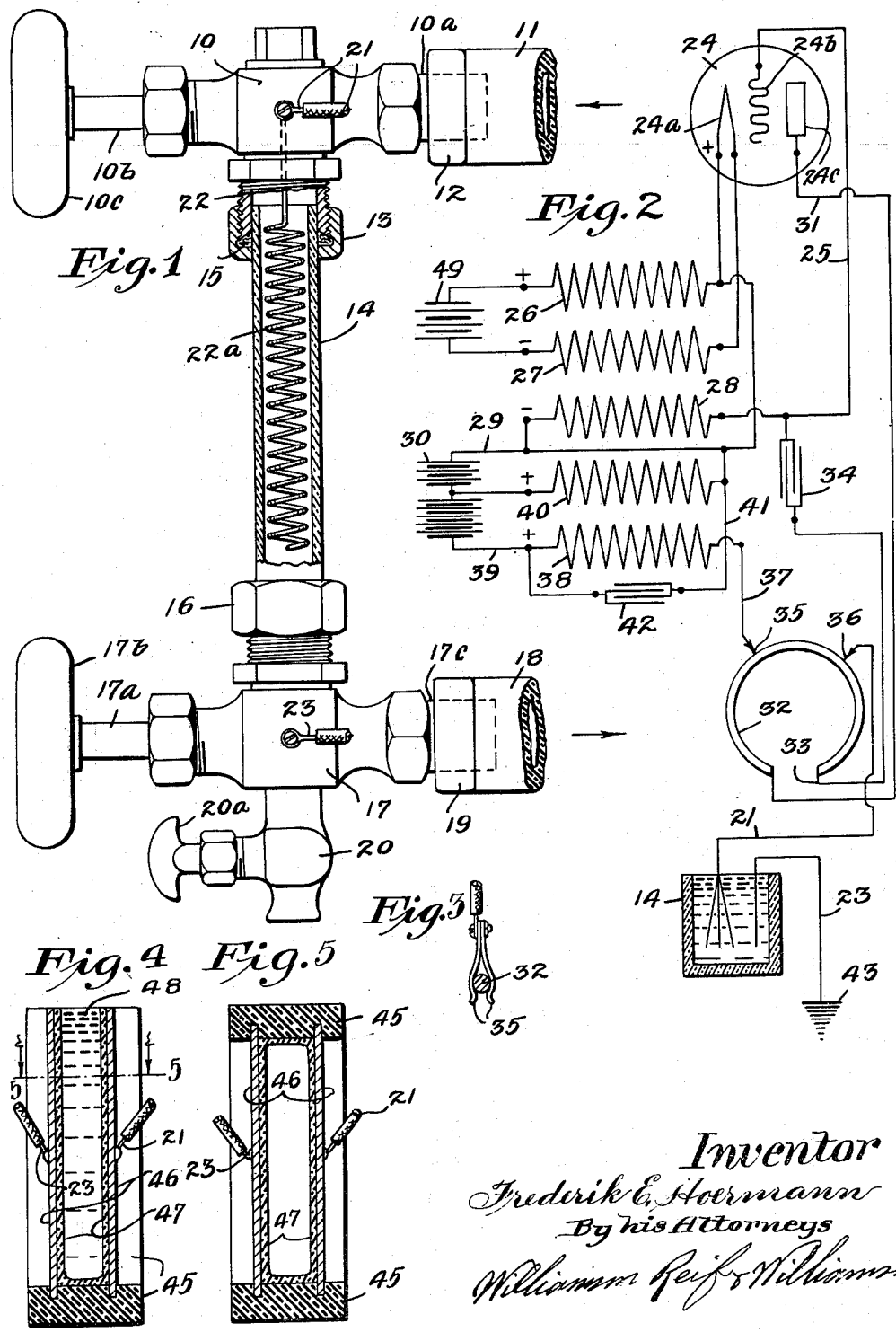
Inventor
Frederik E. Hoermann
By his Attorneys
Williamson Reif & Williamson Patented June 14, 1932

1,863,222

UNITED STATES PATENT OFFICE

FREDERIK E. HOERMANN, OF HASTINGS, MINNESOTA, ASSIGNOR OF ONE-FOURTH TO HENRY M. ROBERTSON AND ONE-FOURTH TO JOSEPH M. SANTO, BOTH OF ST. PAUL, MINNESOTA

METHOD OF TREATING FOOD AND OTHER PRODUCTS WITH HIGH FREQUENCY OSCILLATIONS

Application filed May 20, 1929. Serial No. 364,672.

This invention relates to a process and apparatus for treating food and other products which contain or are subject to the influence of micro-organisms, to render inactive said micro-organisms. It is now well known that the presence of micro-organisms in many products causes them to degenerate in quality or changes the structure due to the increased activity of the micro-organisms when conditions become favorable. It is also well known that many of such products can be treated with heat to destroy or kill the micro-organisms to render the same inactive, which process is known as pasteurization. Such pasteurization however, is objectionable with many products as it produces far-reaching chemical changes or disturbances of the product thus treated and in practically all cases, changes the flavor and aroma of the product and in many cases, alters the general character and composition of the product, destroying vitamines and certain properties of the products. These objectionable effects also occur when the products are subjected to a treatment by radiations from ultra violet rays, which latter treatment has been suggested.

The present invention is applicable to all products subject to the influence of micro-organisms therein and has particularly been applied as a preservation process for fruit and vegetable juices, milk, beverages including beer and wine, or food products subject to or in a state of fermentation, such as cheese and edible fats and oils, where the rancidity, fermentation or undesirable change is due to the action of micro-organisms. The invention is also applicable to various organic products such as certain drug extractions and to other organic products used in the industries, such as rubber latex and the like.

Applicant has discovered that the micro-organisms in various products can be rendered inactive so as to preclude any influence or effect of said organisms upon said products by subjecting said products to the action of high frequency electro-magnetic oscillations of certain frequencies.

It is an object of this invention to provide a process and apparatus for treating products containing or subject to the action of micro-organisms in which such products are subjected to high frequency electro-magnetic oscillations particularly oscillations having a frequency of from sixty million to six hundred million per second.

It is a further object of the invention to provide a process and apparatus in which products containing or subject to the influence of micro-organisms are treated to render inactive such organisms by being subjected to high frequency electro-magnetic oscillations supplied from either an open or closed oscillation circuit, said oscillations being disposed within the electrical field of condensers disposed in such a circuit or between the terminal poles of the oscillation circuit and ground thus in effect making the products to be treated part of the circuit.

It is also an object of the invention to treat products containing or subject to the action of micro-organisms by subjecting the same to high frequency oscillations, as set forth in the preceding paragraph, and concurrently treating said products with ultra-violet radiation with or without the addition of treatment by heat waves. The heat wave treatment may also be applied concurrently with the treatment by the high frequency oscillations without using the ultra-violet radiation.

It is more specifically an object of the invention to treat certain products containing or subject to the influence of micro-organisms such as fruit and vegetable juices, milk, beverages including beer, fermented and non-fermented, cheese, edible fats and oils, various canned fruits, vegetables and syrups, certain drugs and drug extractions as well as other organic substances such as rubber latex and many other products, by subjecting them to the action of high frequency electro-magnetic oscillations having a frequency of from sixty million to six hundred million per second.

These and other objects and advantages of the invention will more fully appear from the following description made in connection with the accompanying drawing illustrating one or more forms of apparatus which may be used to carry out the process, and in which like reference characters refer to similar parts throughout the same and also in which:

Fig. 1 is a view in front elevation of a part of the apparatus used, some parts being broken away and other parts being shown in vertical section;

Fig. 2 is a diagrammatic view of one form of oscillating circuit used;

Fig. 3 is a sectional view of a form of sliding contact used;

Fig. 4 is a view in vertical section through a modified form of treating container used, and Fig. 5 is a horizontal section taken on line 5—5 of Fig. 4 as indicated by the arrows.

In carrying out the process, the product to be treated is placed in some receptacle arranged so that high frequency oscillations can be passed through the product. Any arrangement of receptacle and any apparatus for producing the high frequency oscillations by which this result may be attained may be used. In Figs. 1, 2 and 3 of the drawings one form of apparatus is illustrated by which the process can be carried out.

Referring to Fig. 1, a valve member 10 is shown which has a receiving end 10a to which is connected a conduit 11 by means of any suitable coupling 12, said conduit 11 being of material having good insulating properties. Valve 10 will have an opening and closing member actuated by a stem 10b which in turn will be rotated by a valve hand wheel 10c. Valve 10 is connected at its lower end by a coupling member 13 to the upper end of a quartz tube 14, member 13 being in the form of a cup adapted to receive packing material 15 which is compressed about the bottom of valve 10 and against the tube 14 to form a tight joint. Tube 14 is similarly coupled at its lower end by a coupling 16 to another valve member 17 also having an opening and closing member actuated by a stem 17a which is turned by the valve hand wheel 17b. Valve 17 has an outlet end 17c to which is connected a conduit 18 which is also of good insulating material, said conduit being connected by any suitable coupling 19. A drain cock 20 extends below valve 17 adapted to be opened and closed by a small handle 20a, whereby tube 14 can be drained through the cock 20 when valve 17 is open. An electrical conductor such as the wire 21 is connected to the body of valve 10 and to a wire 22 leading downwardly into tube 14 and terminating in a coil 22a. Another electrical conductor such as the wire 23 is connected to the valve member 17. As stated, any apparatus for producing high frequency oscillations may be connected to the conductors 21 and 23, and the oscillations will pass from the terminal coil 22a to the conductor 23 and through the product to be treated which will be contained in the tube 14. The product is therefore disposed in the oscillation circuit and in reality forms part of the circuit.

In Fig. 2 a high frequency oscillation circuit or apparatus is diagrammatically illustrated. This comprises the three-contact thermionic valve 24 such as is now well known and which is constructed as an oscillation tube. This apparatus comprises a vacuum tube having the three contacts therein, one of which is the filament 24a and in the diagram shown this filament is heated by a battery 49, the positive and negative poles of the battery being connected to the ends of the filament and having interposed therein respectively the coils 26 and 27. The grid contact 24b has a conductor 25 connected thereto which is connected at its other end to a coil 28 which in turn is connected to a conductor 29 connected to the negative side of a high potential battery 30. Conductor 29 is also connected to coil 26 which is in the positive side of the filament circuit. The plate or anode contact 24c of the tube 24 is connected to a conductor 31, the other end of which is connected to one end of an open metallic coil 32 having one convolution and of considerable cross sectional diameter. The other end of this coil is connected to a conductor 33 which in turn is connected to conductor 25, a condenser 34 being interposed in this conductor 33. The coil 32 has a pair of contacts 35 and 36 slidably engaging the same, which may be of the form shown in Fig. 3 and comprising a pair of resilient strips tending to move toward each other and resiliently embracing the coil 32. A conductor 37 is connected to the contact 35 and at its other end to a coil 38, the other end of said coil being connected by a conductor 39 to the positive side of battery 30. A coil 40 has one end connected to the positive side of several cells in series of battery 30 and the other end connected to a conductor 41 which extends from conductor 29 at a point beyond the point to which coil 28 is connected thereto in a direction away from the battery 30 and is connected to conductor 39 between coil 28 and battery 30, a condenser 42 being interposed in conductor 41. Contact 36 is connected to conductor 21 extending into a receptacle which will be assumed to be the receptacle 14 and a ground contact which is the contact 23 extends from receptacle 14 to the ground 43.

With the described circuit the tube or valve 24 will oscillate and the frequency of the oscillations can be varied by moving members 35 and 36 closer together or farther apart on coil 32. As previously stated the apparatus is designed to give high frequency oscillations within a range of from sixty million to six hundred million per second. In the work so far done the best results have been obtained with oscillations of a frequency of from one hundred million to three hundred million. It will be understood that the substance to be treated is placed in the tube 14 and by the operation of the high frequency apparatus the high frequency oscillations are transmitted from the terminal 22a to the valve body 17 and conductor 23 so that these oscillations pass through the substance. The period of treatment varies with different substances and also with the intensity of the electrical energy applied. With one sugar solution containing yeast which was treated, the treatment was continued for a period of from thirty to forty-five minutes with a power of substantially 250 watts in the circuit and good results were obtained. The results or effects of the process are comparable to those obtained by pasteurization, although as above stated the objectionable effects of pasteurization are eliminated. The quartz tube 14 used is not necessary for the treatment of the substances with the high frequency oscillations, but this tube is used so that supplementary or auxiliary treatments can be given with heat or with ultra violet ray radiation. Some work has been done with both the treatments with the high frequency oscillations and with a moderate degree of heat. The degree of heat used is far below that used in the pasteurization of products and below that which would cause any change in the flavor or physical or chemical characteristics of the substance. Some work has also been done with the substance in the quartz tube using both the treatment with high frequency oscillations and the treatments with the ultra violet ray radiation. As before stated, substances treated with ultra violet radiations for a sufficiently long time to have a preservative effect develop objectionable qualities. For instance, it has been found that milk so treated acquires a nasty or disagreeable tast and odor. Milk, however, has been subjected to treatment with applicant's process and apparatus and the micro-organisms therein rendered so inactive that the milk can be kept for a long period without any fermentation or deleterious action. The milk can also be concurrently subjected to both the treatment with high frequency oscillations and the ultra violet radiation treatment and good results obtained. With certain substances the desirable effects can be produced by successive treatments for certain periods of time. This is particularly true when the substance is concurrently treated with heat and the high frequency oscillations. With practically all of the substances so far treated the desired results are obtained by merely subjecting the substances to the treatment of the high frequency oscillations.

In Figs. 4 and 5 another form of container is illustrated which may be used to contain the substance during treatment. This container comprises a casing or frame 45 made of insulating material in which are secured the metal plates 46, the same being arranged in substantially parallel relation and having secured thereto respectively the conductors 21 and 23 of the circuit shown in Fig. 2. The plates 46 will be coated on their inner sides with a thin layer of insulating material 47 which also extends along the frame 45 and will form the inner wall of the container in which the substance 48 to be treated will be placed. The container, it will be seen, is thus really in the form of a condenser and when high frequency oscillations are impressed on the conductors 21 and 23 the substance in the receptacles will be subjected to electro-magnetic stress and thus subjected to the high frequency oscillations.

From the above description it is seen that applicant has provided a process and apparatus by means of which many substances which contain or are subject to the action of micro-organisms can be treated to render said micro-organisms inactive so that the substances will be preserved indefinitely without fermentation or any deleterious action due to the influence of said micro-organisms. While of course the action is not entirely understood, it is thought that the great strain to which the micro-organisms are subjected so enfeebles them that they are incapable of any growth or activity in the substance. Experiments have been made with substances comprising sugar and water solutions containing yeast, which is about the most active of any micro-organism substance. After treatment by applicant's process and apparatus the substances were allowed to stand for long periods and no fermentation or activity on the part of the yeast occurred. Work has also been done with fruit juices, such as orange and grape juice, and after treatment with applicant's process and apparatus these juices remain sweet for long periods and apparently will so continue indefinitely. Beer has also been treated in a fermented and unfermented state and further fermentation has not been detected. The process is applicable to various canned syrups and canned goods of many kinds which when now transported to warmer climates develop objectionable fermentation. As stated, the desired preservative results are secured without in the slightest degree affecting the flavor or the physical or chemical characteristics of the substances. The process and apparatus have thus been amply demonstrated in actual practice and found to be very successful and efficient.

It will, of course, be understood that various changes may be made in the form, details, arrangement and proportions of the apparatus and in the steps and sequence of steps of the method, without departing from the scope of applicant's invention, which generally stated, consists in a method and apparatus capable of carrying out the objects above set forth, such as disclosed and defined in the appended claims.

What is claimed is:—

1. The process of treating food and other products containing or subject to the influence of micro-organisms which consists in disposing said products in a receptacle connecting one side of said receptacle to a ground and the other side to a high frequency oscillation circuit terminal so that said product is in a high frequency oscillation circuit and passing high frequency oscillations, having a frequency of between sixty million and six hundred million per second through said circuit and product.

2. The process of treating food and other products containing and/or subject to the influence of micro-organisms which consists in subjecting said product to high frequency electro-magnetic oscillations, said oscillations having a frequency of from sixty million to six hundred million per second and concurrently treating the product with ultra violet rays.

3. The process of treating food and other products containing and/or subject to the influence of micro-organisms which consists in subjecting said product to high frequency electro-magnetic oscillations, said oscillations having a frequency of from sixty million to six hundred million per second, concurrently treating said product with heat of a moderate degree, said treatment being given during successive periods and being discontinued between said periods.

In testimony whereof I affix my signature.

FREDERIK E. HOERMANN.